US009375638B2

(12) United States Patent
Weaver

(10) Patent No.: US 9,375,638 B2
(45) Date of Patent: Jun. 28, 2016

(54) GAME CONSOLE SWITCH BOX

(71) Applicant: Lloyd A. Weaver, Los Angeles, CA (US)

(72) Inventor: Lloyd A. Weaver, Los Angeles, CA (US)

(*) Notice: Subject to any disclaimer, the term of this patent is extended or adjusted under 35 U.S.C. 154(b) by 333 days.

(21) Appl. No.: 14/146,206

(22) Filed: Jan. 2, 2014

(65) Prior Publication Data

US 2015/0182853 A1    Jul. 2, 2015

(51) Int. Cl.
| A63F 9/24 | (2006.01) |
| A63F 13/98 | (2014.01) |
| A63F 13/26 | (2014.01) |
| A63F 13/235 | (2014.01) |

(52) U.S. Cl.
CPC .............. *A63F 13/02* (2013.01); *A63F 13/235* (2014.09); *A63F 13/26* (2014.09); *A63F 13/98* (2014.09)

(58) Field of Classification Search
USPC ..................................................... 463/31–43
See application file for complete search history.

(56) References Cited

U.S. PATENT DOCUMENTS

| 7,024,501 B1 | 4/2006 | Wright | |
| 7,570,228 B2 | 8/2009 | Love | |
| 7,653,123 B1* | 1/2010 | Woodings | H04B 1/7075 375/147 |
| 8,038,533 B2* | 10/2011 | Tsuchiyama | A63F 13/12 463/42 |
| 8,529,352 B2 | 9/2013 | Mae et al. | |
| 2003/0020840 A1* | 1/2003 | Hays | H04N 5/268 348/837 |
| 2010/0083341 A1* | 4/2010 | Gonzalez | A63F 13/00 725/149 |
| 2011/0256928 A1* | 10/2011 | Dobyns | A63F 13/06 463/36 |
| 2012/0244934 A1 | 9/2012 | Burckart et al. | |
| 2013/0244934 A1* | 9/2013 | Duggan | C07K 14/57563 514/6.9 |

FOREIGN PATENT DOCUMENTS

GB    2372164    8/2008

* cited by examiner

*Primary Examiner* — Masud Ahmed

(57) ABSTRACT

An apparatus for dividing a split screen video game display into two separate video displays, for displaying two different screens. The apparatus includes a main switch box which connects to the game console and emulates all the connections expected by the game console. The main switch box wirelessly connects to a receiver switch box. The main switch box takes the video signal from the game console, divides the split screen into two halves, and outputs one half on a first screen connected to the main switch box and sends the other half to the receiver switch box for output on a second screen connected to the receiver switch box. The main switch box also takes a first headset input signal and a second headset input signal from the receiver switch box and combines the headset signals into one signal for sending to the game console.

16 Claims, 3 Drawing Sheets

GAME CONSOLE SWITCH BOX

BACKGROUND OF THE INVENTION

1. Field of the Invention

The present invention relates to a game console switch box for wirelessly splitting multimedia from a video game console.

2. Description of Related Art

Video game consoles generally connect to one display. For multiplayer games, each player has his own game console and display. However, when only one game console and display are available, the players must share the display. Often, the display is shared by showing the first player's screen in one half, such as top half, of the single display, and the second player's screen in the bottom half. Each player sees a distorted or otherwise truncated screen, as the result of sharing the single display.

Even when more than one display is available, game consoles are generally configured to connect to only one display. Mirroring the same video screen on another display fails to take advantage of the added display. In addition, the second display may be remotely located, such as in another room, from the game console.

There is a need for a switch box which takes a split video game screen and produces an output on two displays.

SUMMARY OF THE INVENTION

The present invention takes a split video screen displaying multiplayers and displays each player on a separate display. The present invention also combines two headset inputs into one signal for the game console.

An apparatus for separating a split video game screen is housed in a main switch box that includes a first controller having a first headset input, a multimedia input, a first multimedia output, a headset output, a first controller output, and a second controller output. A receiver switch box connected to the main switch box through a wireless link includes a second controller having a control input, a second headset input, and a second multimedia output. The main switch box receives a second controller signal from the receiver switch box through a wireless link, receives a second headset signal from the receiver switch box through the wireless link, and combines the first headset signal and the second headset signal. The main switch box separates the split screen multimedia signal into a first screen signal and a second screen signal. The second screen signal is provided to the receiver switch box through the wireless link.

The system for separating a split video game screen into separate displays includes a first display, a second display remote from the first display, a first controller, a second controller, a third controller, a fourth controller, a first headset, a second headset, a game console receiving a signal from the first controller, the second controller, and the headset and outputting a multimedia signal. A main switch box connected to the game console and the first display includes a first controller and a second controller, the first controller having a first headset input, a multimedia input for receiving the multimedia signal from the game console, a first multimedia output for sending a first screen signal to the first display, a headset output for sending the headset signal to the game console, a first controller output for sending a first controller signal or a third controller signal, as a first controller input signal, to the game console. The second controller connected to a game console for sending a second controller signal or a fourth controller signal, as the second controller input signal, to the game console. The system includes a receiver switch box connected to the second display, and to the main switch box through a wireless link. A third controller and a fourth controller, in the receiver switch box, have a second headset input, and a second multimedia output for sending a second screen signal to the second display. The main switch box receives the third controller signal and the fourth controller signal from the receiver switch box through the wireless link. It receives the second headset signal from the receiver switch box through the wireless link and combines the first headset signal and the second headset signal into a single headset input signal. The main switch box separates the multimedia signal into a first screen signal and a second screen signal and sends the second screen signal to the receiver switch box through the wireless link.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

The implementations of the various features of the present invention are described with reference to the drawings. The drawings and the associated description are provided to illustrate preferred embodiments of the present invention and are not intended to limit the scope of the present invention. Throughout the drawings, like reference numbers are re-used to indicate correspondence between the referenced elements.

Figure 1:
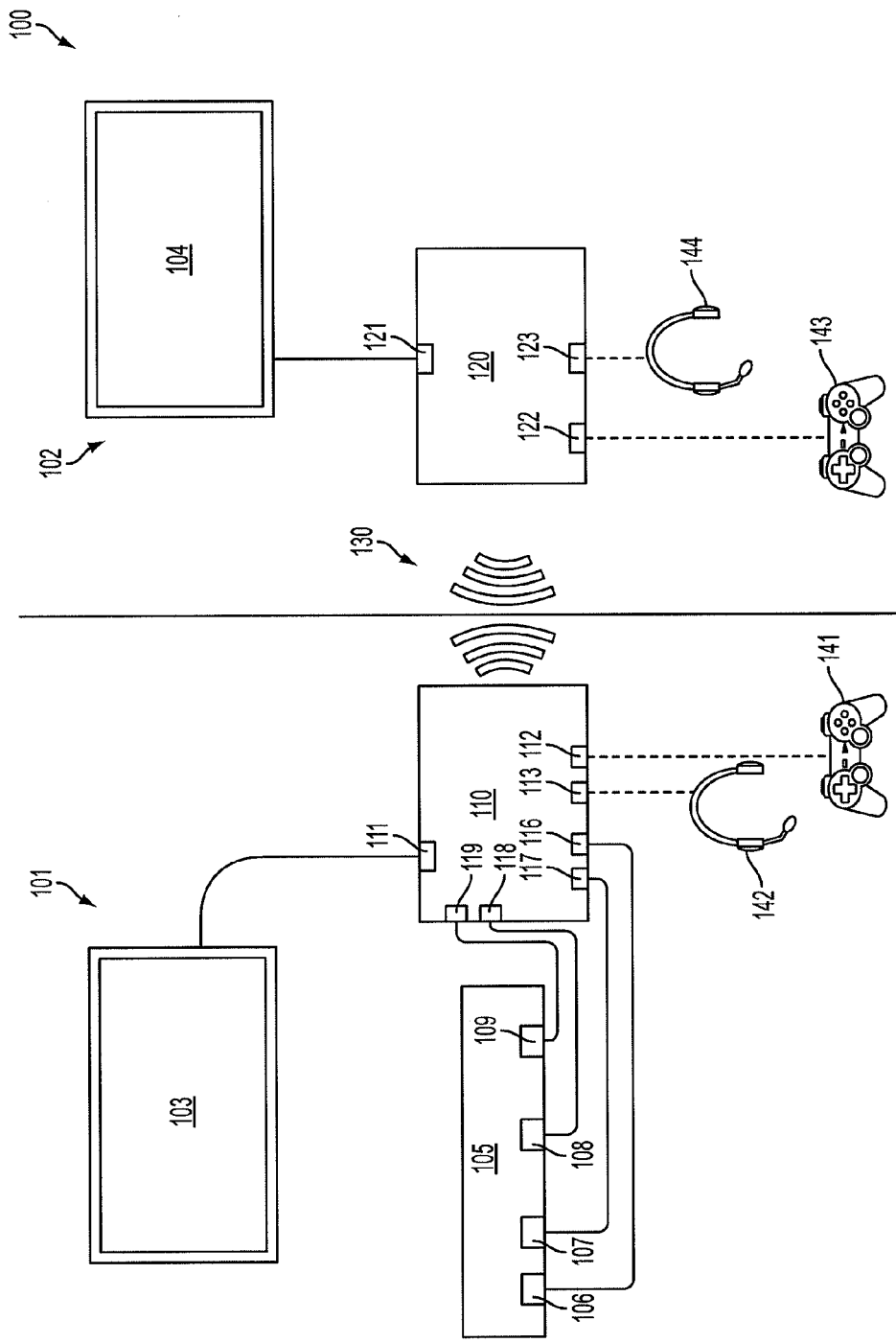
FIG. 1 is a block diagram of a switch box used across two rooms according to the present invention.

In one preferred embodiment, a multiple room configuration 100, shown in FIG. 1, includes a first room 101 and a second room 102. The first room 101 includes a first display 103, a game console 105, a main switch box 110, a first controller 141, and a first headset 142. The second room 102 includes a second display 104, a receiver switch box 120, a second controller 143, and a second headset 144. Although FIG. 1 shows various connections as wired, the connections may also be wireless.

The first display 103 may be a television or other similar display device. The second display 104 may be a television or other similar display device, and may be the same size as, or a different size from the first display 103.

The game console 105 includes a computer, or other computing device capable of receiving user inputs. The game console 105 includes a first controller input port 106, a second controller input port 107, a headset input port 108, and a multimedia output port 109. The first controller input port 106 and the second controller input port 107 are data ports, such as USB ports, which allow videogame controllers such as the first controller 141 or other human interface devices, to connect to the game console 105 for user input. The headset input port 108 is a data or audio port, such as a USB port or a headphone jack, which allow headsets such as the headset 142 to connect to the game console 105 for audio. The multimedia output port 109 is a data or audio/video port, such as an HDMI port, which allows a display, such as the display 103, to connect to the game console for audio/video display. The multimedia output port 109 may include separate audio and video connections.

The main switch box 110 includes a first controller output port 116, a second controller output port 117, a headset output port 118, a multimedia input port 119, a multimedia output port 111, a first controller input port 112, and a headset input port 113. The first controller output port 116 of the main switch box 110 connects to the first controller input port 106 of the game console 105. The second controller output port 117 of the main switch box 110 connects to the second controller input port 107 of the game console 105. The headset output port 118 of the main switch box 110 connects to the headset input port 108 of the game console 105. The multimedia input port 119 of the main switch box 110 connects to the multimedia output port 109 of the game console 105. The first controller 141 connects, either wirelessly or by wire, to the main switch box input port 112. The headset 142 connects, either wirelessly or by wire, to the headset input port 113 of the main switch box 110. The display 103 connects to the multimedia output port 111 of the main switch box 110. These connections between the main switch box 110 and the game console 105 allow the game console 105 to behave as if the appropriate connections were made directly to it. For example, the game console 105 "sees" the first controller 141 as if it were directly connected to the game console 105, even if there are intermediary connections. The game console 105 outputs audio and video to the display 103 through the main switch box 110 as if the game console 105 was directly connected to the display 103.

A receiver switch box 120 has a second controller input port 122, a second headset input port 123, and a second multimedia output port 121. A second controller 143 connects, either wirelessly or by wire, to the second controller input port 122. A second headset 144 connects, either wirelessly or by wire, to the second headset input port 123. A second display 104 connects to the second multimedia output port 121 of the receiver switch box 120.

The receiver switch box 120 connects to the main switch box 110 preferably through a wireless link 130. Although, the connection may be a wire line. The wireless connection 130 may be implemented as a direct wireless connection, or as part of a wireless network. The wireless connection 130 allows the second controller 143 to connect to the second controller input port 107 of the game console 105.

The first headset 142 and the second headset 144 both connect to the headset input port 108 of the game console as if it was a direct connection to the game console 105.

Because the game console 105, and games playable on the game console 105, may be configured for one headset, the main switch box 110 and the receiver switch box 120 allow two headsets to act as one. In other words, the same audio signal is output to the first headset 142 and the second headset 144. The audio input from the first headset 142 is mixed with the audio input from the second headset 144 by the main switch box 110 before being sent to the game console 105 as a compound audio signal. The game console 105 receives the compound audio signal and behaves as if only one headset were connected. This allows two headsets to be used for a game console that only provides one headset input port 108.

Figure 2A:
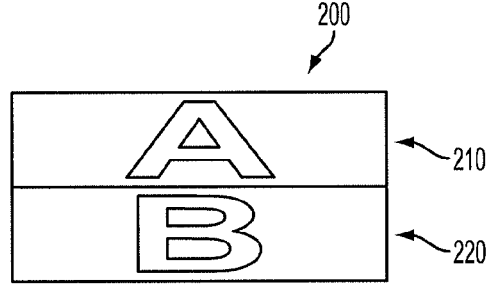
FIG. 2A is an illustration of a split screed used in the prior art.

The receiver switch box 120 may output the same audio/video signal to the second display 104 as the main switch box 110 outputs to the first display 103. The present invention allows two different video outputs to be displayed, one on each of first display 103 and second display 104. FIG. 2A shows how a two-player game is displayed on a single screen. The screen 200 shows a first player sub-screen 210 and a second player sub-screen 220, in a split-screen configuration. Although FIG. 2A shows a horizontal split-screen, the screen may be split vertically or portioned in any other appropriate manner. As seen in FIG. 2A, the sharing of the screen 200 may cause the first player sub-screen 210 and the second player sub-screen 220 to be distorted, or otherwise modified, to fit the reduced screen space.

Figure 2B:
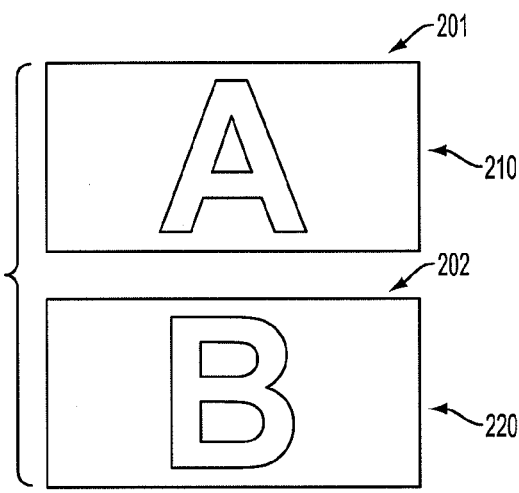
FIG. 2B is an illustration of the split screen of FIG. 2A separated into two screens according to the present invention.

The main switch box 110 splits the video signal pushing the split-screen display into two separate video signals. This restores full screen display to the first player sub-screen 210 and the second player sub-screen 220 as shown in FIG. 2B. A first full screen display 201 displays only the first player sub-screen 210. A second full screen display 202 displays only the second player sub-screen 220. The first full screen display 201 may be the first display 103 of FIG. 1. The second full screen display 202 may be the second display 104 of FIG. 1. This allows each player to have his own display. As shown in FIG. 2B, each player sub-screen is stretched, to counteract distortion and use of the full screen. However, the output signal may remain unaltered in size. The main switch box 110 can determine from the video output signal from the game console 105 how to divide the images, and may pre-process a stretched image to be sent to the second player screen 202 from the receiver switch box 120. Or, the actual second player sub-screen 220 may be sent to the receiver switch box 120 which appropriately scales the video signal for display on the second player screen 101. Because of a delay in the wireless connection 130 between the switch box 110 and the receiver switch box 120, there may be a 1 frame delay in the video.

Figure 3:
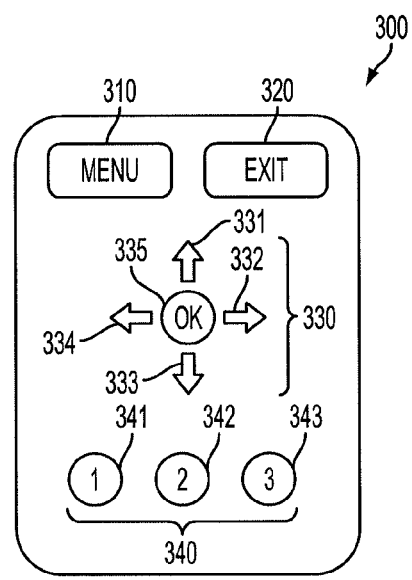
FIG. 3 is a diagrammatic illustration of a remote controller for use with the present invention.

FIG. 3 illustrates a remote control 300, which can be used to control video output settings. A menu button 310 prompts a menu on either the first display 103 and/or the second display 104. The remote control 300 is preferably used with the main switch box 110. Alternatively, the remote control 300 may be used with the receiver switch box 120. The menu would then be displayed on the second display 104. An exit button 320 exits the menu. Selection buttons 330 include an up button 331, right button 332, down button 333, left button 334, and OK button 335, for making menu selections. Preset buttons 340 include a first button 341, a second button 342, and a third button 343. The menu allows selection of which half or portion of the video display to send to which switch box, including scaling options. The same video may also be displayed on both switch boxes. Further options include which switch box is treated as which player, and headset mixing options, such as whether to mix or isolate headset signals. The preset buttons 340 are defined to preset settings.

Alternatively, the up button 331 selects the top half to be displayed on the main switch box 110, and the down button 333 selects the bottom half to be displayed on the main switch box 110. The OK button 335 switches between views, and the menu button goes to a split-screen (i.e. normal) view.

In certain other implementations, the functions of the remote control 300 may be performed by the first controller 141 or the second controller 143. For example, certain uncommon button combinations on the first controller 141 may allow switching between different views. The main switch box 110 and/or the receiver switch box 120 can be configured to recognize specific button combinations from the first controller 141 and/or the second controller 143.

Figure 4:
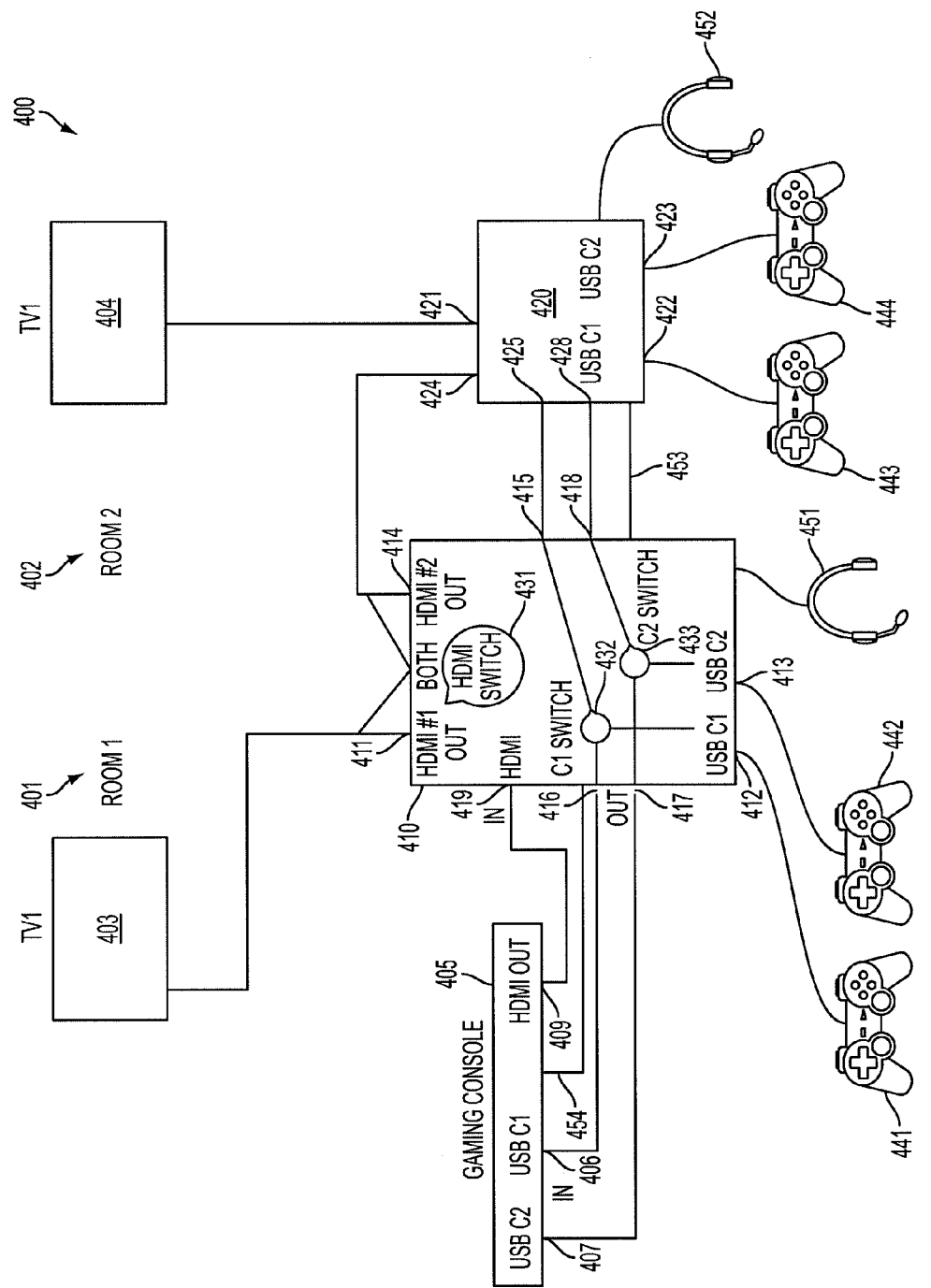
FIG. 4 is a block diagram of a switch box used across two rooms according to another embodiment of the present invention.

FIG. 4 illustrates a system 400, an alternate embodiment of the present invention. Although the various connections are depicted as wire connections, one or more of the depicted connections may be wireless. A first room 401 includes a first display 403, a game console 405, a main switch box 410, a first controller 441, a second controller 442, and a first headset 451. A second room 402 includes a second display 404, a receiver switch box 420, a third controller 443, a fourth controller 444, and a second headset 452.

The game console 405 includes a first controller input port 406, a second controller input port 407, a multimedia output port 409, and a headset input port 454.

The main switch box 410 includes a first multimedia output port 411, a second multimedia output port 414, a multimedia input port 419, a first controller output port 416, a second controller output port 417, a first controller input port 412, a second controller input port 413, a first controller connection port 415, a second controller connection port 418, a multimedia switch 431, a first controller switch 432, a second controller switch 433, and a headset connection 453 with the receiver switch box 420.

The receiver switch box 420 includes a first controller input port 422, a second controller input port 423, a first controller output port 425, a second controller output port 428, a multimedia input port 424, and a multimedia output port 421.

The system 400 functions in a similar manner to FIG. 1, with respect to headset mixing and the video splitting functions. Only the differences will be discussed, for simplicity. The multimedia switch 431, the first controller switch 432, and the second controller switch 433 are preferably physical switches. They may, however, be implemented in logic. The multimedia switch 431 controls whether the audio/video signals are output to the first multimedia output port 411, the second multimedia output port 414, or both ports. The first controller switch 432 controls whether the first controller 441 or the third controller 443 is connected to the first controller input port 406 of the gaming console. Similarly, the second controller switch 433 controls whether the second controller 442 or the fourth controller 444 is connected to the second controller input port 407 of the gaming console. This configuration allows the game to be played in just the first room 401, just the second room 402 (remote from the game console 405), or split between the two rooms.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. An apparatus for dividing a split screen gaming video signal into separate video signals comprising:
   a main switch box connected to a first display, the main switch box including:
      a first controller input for receiving first controller signals,
      a first headset input for receiving first headset signals,
      a multimedia input for receiving multimedia signals,
      a first multimedia output for sending first video signals to the first display,
      a headset output for sending headset audio signals,
      a first controller output for sending the first controller signals, and
      a second controller output for sending second controller signals; and
   a receiver switch box remote from the main switch box, connected to a second display, and connected to the main switch box through a link, including:
      a second controller input for receiving second controller signals,
      a second headset input for receiving second headset signals, and
      a second multimedia output for sending second video signals to the second display;

the main switch box receives the second controller signals from the receiver switch box through the link, receives the second headset signal from the receiver switch box through the link, combines the first headset signal and the second headset signal into a headset input signal, and separates the multimedia signal into a first screen signal and a second screen signal, sending the second screen signal to the receiver switch box through the link, wherein the first screen signal is a scaled first portion of the multimedia signal and the second screen signal is a scaled second portion of the multimedia signal.

2. The apparatus of claim 1, wherein the first screen signal is a top half of the multimedia signal, and the second screen signal is a bottom half of the multimedia signal.

3. The apparatus of claim 1, wherein the first screen signal is a bottom half of the multimedia signal, and the second screen signal is a top half of the multimedia signal.

4. The apparatus of claim 1, wherein the main switch box scales the second screen signal before sending the second screen signal to the receiver switch box.

5. The apparatus of claim 1, further comprising a remote control configured to adjust the first screen signal or the second screen signal.

6. The apparatus of claim 1, wherein the multimedia signal includes a digital video signal.

7. The apparatus of claim 1, wherein the multimedia signal includes an audio signal.

8. A system for dividing a gaming video signal, comprising:
   a first video display;
   a second video display, remote from the first display;
   a first controller configured to output first controller signals;
   a second controller configured to output second controller signals;
   a first headset configured to output first audio signals;
   a second headset configured to output second audio signals;
   a game console configured to receive first controller signals, second controller signals, and headset audio signals, and output multimedia video/audio signals;
   a main switch box connected to the game console and the first display, the main switch box including:
      a first controller input for receiving the first controller signals,
      a first headset input for receiving the first headset audio signals,
      a multimedia input for receiving the multimedia signals from the game console,
      a first multimedia output for sending first screen signals to the first display,
      a headset output for sending headset audio signals to the game console,
      a first controller output for sending first controller signals to the game console,
      a second controller output for sending second controller signals to the game console; and
   a receiver switch box connected to the second display, and connected to the main switch box through a link, the receiver switch box including:
      a second controller input for receiving second controller signals from the second controller,
      a second headset input for sending second headset signals,
      a second multimedia output for sending second screen signals to the second display,
   the main switch box configured to receive the second controller signals from the receiver switch box through a link, receive the second headset signals from the receiver switch box through the link, and combine the first headset signals and the second headset signals into headset input signals, the main switch box configured to divide the multimedia signals into first screen signals and second screen signals and send the second screen signals to the receiver switch box through the link, wherein the first screen signals are a scaled first portion of the multimedia signals, and the second screen signals are a scaled second portion of the multimedia signals.

9. The system of claim 8, wherein the first screen signals are a top half display of the multimedia signals, and the second screen signals are a bottom half display of the multimedia signals.

10. The system of claim 8, wherein the first screen signals are a bottom half display of the multimedia signals, and the second screen signals are a top half display of the multimedia signals.

11. The system of claim 8, wherein the main switch box scales the second screen signals before sending the second screen signals to the receiver switch box.

12. The system of claim 8, further comprising a remote control configured to adjust the first screen signals or the second screen signals.

13. The system of claim 8, wherein the multimedia signals include digital video signals.

14. The system of claim 8, wherein the multimedia signals include audio signals.

15. A system for dividing gaming video signals, comprising:
   a first display;
   a second display remote from the first display;
   a first controller;
   a second controller;
   a third controller;
   a fourth controller;
   a first headset;
   a second headset;
   a game console connected for receiving signals from the first controller, the second controller, and a headset, and output a multimedia signal;
   a main switch box connected to the game console and the first display, the main switch box including:
      a first controller input configured for receiving the first controller signals from the first controller,
      a second controller input for receiving second controller signals from the second controller,
      a first headset input for receiving first headset signals from the first headset,
      a multimedia input for receiving multimedia signals from the game console,
      a first multimedia output for sending a first screen signal to the first display,
      a headset output for sending headset audio signals to the game console,
      a first controller output for sending first controller signals or third controller signals to the game console as first controller signals, and
      a second controller output for sending second controller signals or fourth controller signals to the game console as second controller signals; and
   a receiver switch box connected to the second display and to the main switch box through a wireless link, the receiver switch box including:
      a third controller input;

a fourth controller input;
a second headset input, and
a second multimedia output for sending second screen signals to the second display;

the main switch box receiving third controller signals and fourth controller signals from the receiver switch box through the wireless link, receiving second headset audio signals from the receiver switch box through the wireless link and combining the first headset signals and the second headset signals into headset input signals, the main switch box dividing the multimedia signals into first screen signals and second screen signals and sending the second screen signals to the receiver switch box through the wireless link, wherein the first screen signals are a scaled first portion of the multimedia signals, and the second screen signals are a scaled second portion of the multimedia signals.

16. The system of claim 15, wherein a remote control selects the first controller signal or the third controller signal as the first controller input signal and selects the second controller signal or the fourth controller signal as the second controller input signal.

\* \* \* \* \*